US012365059B2

(12) United States Patent
Klein et al.

(10) Patent No.: US 12,365,059 B2
(45) Date of Patent: Jul. 22, 2025

(54) WOODWORKING DEVICE ACCESSORIES

(71) Applicant: Magswitch Technology, Inc., Superior, CO (US)

(72) Inventors: Andrew Klein, Parker, CO (US); David H. Morton, Boulder, CO (US)

(73) Assignee: Magswitch Automation Company, Superior, CO (US)

( * ) Notice: Subject to any disclaimer, the term of this patent is extended or adjusted under 35 U.S.C. 154(b) by 351 days.

(21) Appl. No.: 17/954,067

(22) Filed: Sep. 27, 2022

(65) Prior Publication Data

US 2023/0096504 A1 Mar. 30, 2023

Related U.S. Application Data

(60) Provisional application No. 63/248,963, filed on Sep. 27, 2021.

(51) Int. Cl.
*B25B 11/00* (2006.01)
*B23Q 16/00* (2006.01)
*B27C 3/02* (2006.01)

(52) U.S. Cl.
CPC .......... *B23Q 16/001* (2013.01); *B25B 11/002* (2013.01); *B27C 3/02* (2013.01)

(58) Field of Classification Search
CPC ........ B23Q 16/001; B23Q 16/00; B25B 11/00
See application file for complete search history.

(56) References Cited

U.S. PATENT DOCUMENTS

| 3,572,680 | A | * | 3/1971 | Neff | B23Q 1/28 409/219 |
| 5,337,641 | A | * | 8/1994 | Duginske | B27B 27/02 33/468 |
| 2020/0130146 | A1 | * | 4/2020 | Redman | B25B 11/002 |
| 2020/0290177 | A1 | * | 9/2020 | Wong | B25B 11/002 |
| 2023/0096504 | A1 | * | 3/2023 | Klein | B23Q 16/001 144/253.1 |

FOREIGN PATENT DOCUMENTS

WO 2010020006 A1 2/2010

OTHER PUBLICATIONS https://www.youtube.com/watch?v=PatcFnp35Bc May 26, 2022.*
Gerhardt, Nick; Magnetic Fence for Drill Press or Band Saw; The Family Handyman; Feb. 28, 2018.
Magfence II Band Saw Fence & F.A.S.T.; Magnetic Fence & AccuRight Log Mill; The Wayback Machine; Aug. 14, 2021.

* cited by examiner

*Primary Examiner* — Lee D Wilson
(74) *Attorney, Agent, or Firm* — Faegre Drinker Biddle & Reath LLP (57) ABSTRACT

Exemplary accessories for use with woodworking supports of woodworking devices may include a fence for a drill press. The fence may include a plurality of magnetic couplers, a base, and a stop block. An exemplary stop block may include a bearing.

23 Claims, 13 Drawing Sheets

WOODWORKING DEVICE ACCESSORIES

RELATED APPLICATION

This application claims the benefit of U.S. Provisional Patent Application No. 63/248,963, filed Sep. 27, 2021, titled WOODWORKING DEVICE ACCESSORIES, the entire disclosure of which is expressly incorporated by reference herein.

FIELD

The present disclosure relates to accessories for woodworking supports and in particular to fences and/or stop blocks to position and/or hold stock during an operation with a woodworking device having a woodworking support.

BACKGROUND

Exemplary woodworking supports include tables and rails of one or more woodworking devices, such as drill presses, table saws, router tables, jointer tables, shaper tables, band saw tables and similar stock cutting machines. Various accessories including jigs, fences, miter gauges, featherboards and other suitable accessories. In regards to fences for drill presses, a need exists for a fence which is easy to setup and adaptable to a plurality of operations.

It is with respect to these and other general considerations that embodiments have been described. Also, although relatively specific problems have been discussed, it should be understood that the embodiments should not be limited to solving the specific problems identified in the background.

SUMMARY

In an exemplary embodiment of the present disclosure, an accessory for a woodworking device having a ferromagnetic woodworking support and a cutting tool is provided. The accessory comprising a base having a first side, a second side opposite the first side, a bottom, and a top, the base being ferromagnetic and a plurality of magnetic couplers positioned on the first side of the base. Each of the plurality of magnetic couplers comprising: a housing; a switchable magnetic flux source supported by the housing switchable between an ON state wherein the respective magnetic coupler is adapted to be magnetically coupled in a fixed location relative to the ferromagnetic woodworking support and an OFF state wherein the respective magnetic coupler is adapted to be movable relative to the ferromagnetic woodworking support; and a plurality of woodworking support engagement surfaces supported by the housing and magnetically coupled to the switchable magnetic flux source, the plurality of woodworking support engagement surfaces adapted to contact the ferromagnetic woodworking support, a first woodworking support engagement surface of the plurality of woodworking support engagement surfaces corresponding to a north pole of the respective magnetic coupler and a second woodworking support engagement surface of the plurality of woodworking support engagement surfaces corresponding to a south pole of the respective magnetic coupler. The accessory further comprising a plurality of mechanical couplers which couple the plurality of magnetic couplers to the base and a stop block magnetically couplable to the base. The stop block comprising: a stop block base having at least one stop surface; and a stop block switchable magnetic flux source supported by the stop block base, the stop block switchable magnetic flux source being switchable between an ON state wherein the stop block switchable magnetic flux source is adapted to be magnetically coupled in a fixed location relative to the second side of the base and an OFF state wherein the stop block switchable magnetic flux source is adapted to be movable relative to the second side of the base; and a plurality of stop block engagement surfaces supported by the stop block base and magnetically coupled to the stop block switchable magnetic flux source, the plurality of stop block engagement surfaces positioned to contact the base, a first stop block engagement surface of the plurality of stop block engagement surfaces corresponding to a north pole of the stop block and a second stop block engagement surface of the plurality of stop block engagement surfaces corresponding to a south pole of the stop block.

In an example thereof, each of the plurality of magnetic couplers are positioned completely on the first side of the base.

In another example thereof, the stop block is coupled the base in a plurality of arrangements. In a variation thereof, the plurality of arrangements includes a first arrangement wherein the stop block is positioned on the second side of the base and a first side of the stop block is coplanar with the bottom of the base. In another variation thereof, the plurality of arrangements includes a second arrangement wherein the stop block is positioned on the second side of the base and a first side of the stop block is parallel with the bottom of the base and offset upward relative to the bottom of the base. In a further variation thereof, the plurality of arrangements includes a third arrangement wherein the stop block is positioned on the second side of the base and a first side of the stop block is angled relative to the bottom of the base. In a still further variation thereof, the plurality of arrangements includes a fourth arrangement wherein the stop block is positioned on the first side of the base.

In a further example thereof, each of the magnetic couplers are adapted to be magnetically coupled to the woodworking support in a vertical coupling direction and mechanically coupled to the base in a horizontal coupling direction. In a variation thereof, the base includes a plurality of interfaces to mechanically couple the plurality of magnetic couplers to the base in a plurality of arrangements. In another variation thereof, the plurality of interfaces are spaced apart along a first direction perpendicular to the horizontal coupling direction. In a further variation thereof, the base includes a first handle having an opening extending from the first side of the base to the second side of the base. In still another variation, the base includes a central recess sized to receive the cutting tool of the woodworking device, the central recess extending from the first side of the base to the second side of the base. In yet still another variation, the base includes a second handle having an opening extending from the first side of the base to the second side of the base, the central recess being positioned between the first handle and the second handle.

In yet another example thereof, the base includes a first handle having an opening extending from the first side of the base to the second side of the base. In a variation thereof, the base includes a central recess sized to receive the cutting tool of the woodworking device, the central recess extending from the first side of the base to the second side of the base. In another variation thereof, the base includes a second handle having an opening extending from the first side of the base to the second side of the base, the central recess being positioned between the first handle and the second handle.

In yet still another example thereof, for each of the plurality of magnetic couplers, the switchable magnetic flux source includes a plurality of permanent magnets.

In a further still example thereof, for each of the plurality of magnetic couplers, the switchable magnetic flux source includes a plurality of permanent magnets, the plurality of permanent magnets including a first permanent magnet and a second permanent magnet movable relative to the first permanent magnet. In a variation thereof, each of the plurality of magnetic couplers further includes an operator input to orient the second permanent magnet relative to the first permanent magnet in one of the ON state wherein the respective magnetic coupler is adapted to be magnetically coupled in the fixed location relative to the ferromagnetic woodworking support and the OFF state wherein the respective magnetic coupler is adapted to be movable relative to the ferromagnetic woodworking support.

In yet a further still example thereof, the stop block switchable magnetic flux source includes a plurality of permanent magnets.

In another yet further example thereof, the stop block switchable magnetic flux source includes a plurality of permanent magnets, the plurality of permanent magnets including a first permanent magnet and a second permanent magnet movable relative to the first permanent magnet. In a variation thereof, the stop block further includes an operator input to orient the second permanent magnet of the stop block switchable magnetic flux source relative to the first permanent magnet of the stop block switchable magnetic flux source in one of the ON state wherein the stop block switchable magnetic flux source is adapted to be magnetically coupled in the fixed location relative to the second side of the base and the OFF state wherein the stop block switchable magnetic flux source is adapted to be movable relative to the second side of the base.

In yet a further exemplary embodiment of the present disclosure, a stop block for use with a woodworking device is provided. The stop block comprising: a stop block base having at least one stop surface; a stop block switchable magnetic flux source supported by the stop block base; a plurality of stop block engagement surfaces supported by the stop block base and magnetically coupled to the stop block switchable magnetic flux source; and a bearing supported by the stop block base. The stop block switchable magnetic flux source being switchable between an ON state wherein the stop block switchable magnetic flux source is adapted to be magnetically coupled in a fixed location relative to the woodworking device and an OFF state wherein the stop block switchable magnetic flux source is adapted to be movable relative to the woodworking device the plurality of stop block engagement surfaces positioned to contact the woodworking device. A first stop block engagement surface of the plurality of stop block engagement surfaces corresponding to a north pole of the stop block and a second stop block engagement surface of the plurality of stop block engagement surfaces corresponding to a south pole of the stop block. The bearing including an inner portion and an outer portion rotatable relative to the inner portion, a circumferential surface of the outer portion extending beyond an exterior envelope of the stop block base.

BRIEF DESCRIPTION OF THE DRAWINGS

The above-mentioned and other features and advantages of this disclosure, and the manner of attaining them, will become more apparent and will be better understood by reference to the following description of exemplary embodiments taken in conjunction with the accompanying drawings, wherein.

Corresponding reference characters indicate corresponding parts throughout the several views. The exemplification set out herein illustrates an exemplary embodiment of the invention and such exemplification is not to be construed as limiting the scope of the invention in any manner.

DETAILED DESCRIPTION OF THE DRAWINGS

For the purposes of promoting an understanding of the principles of the present disclosure, reference is now made to the embodiments illustrated in the drawings, which are described below. The embodiments disclosed herein are not intended to be exhaustive or limit the present disclosure to the precise form disclosed in the following detailed description. Rather, the embodiments are chosen and described so that others skilled in the art may utilize their teachings. Therefore, no limitation of the scope of the present disclosure is thereby intended. Corresponding reference characters indicate corresponding parts throughout the several views.

The terms "couples", "coupled", "coupler" and variations thereof are used to include both arrangements wherein the two or more components are in direct physical contact and arrangements wherein the two or more components are not in direct contact with each other (e.g., the components are "coupled" via at least a third component), but yet still cooperate or interact with each other.

In some instances throughout this disclosure and in the claims, numeric terminology, such as first, second, third, and fourth, is used in reference to various components or features. Such use is not intended to denote an ordering of the components or features. Rather, numeric terminology is used to assist the reader in identifying the component or features being referenced and should not be narrowly interpreted as providing a specific order of components or features.

Figure 1:
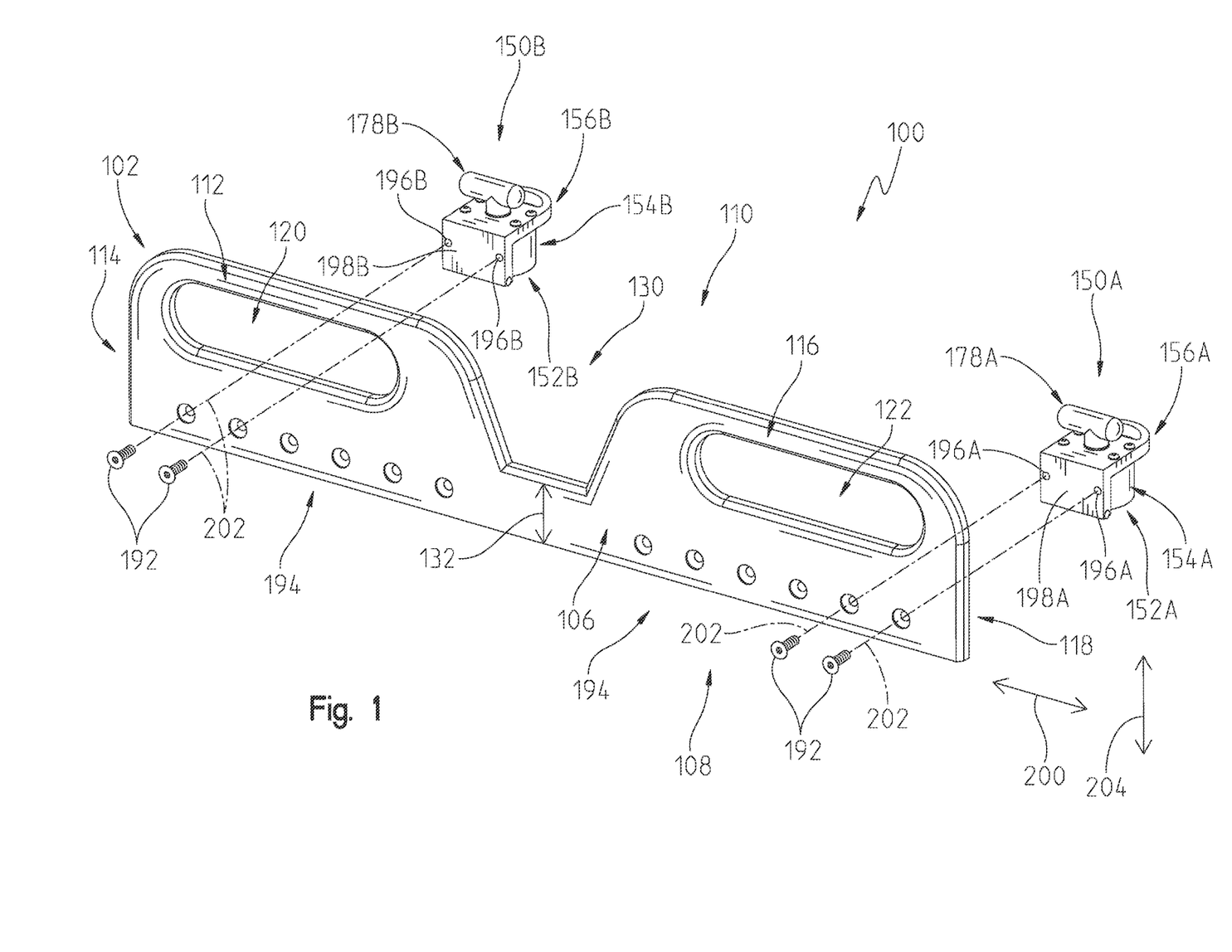
FIG. 1 illustrates a front exploded perspective view of an exemplary accessory, a fence, for use with a woodworking support.
Figure 2:
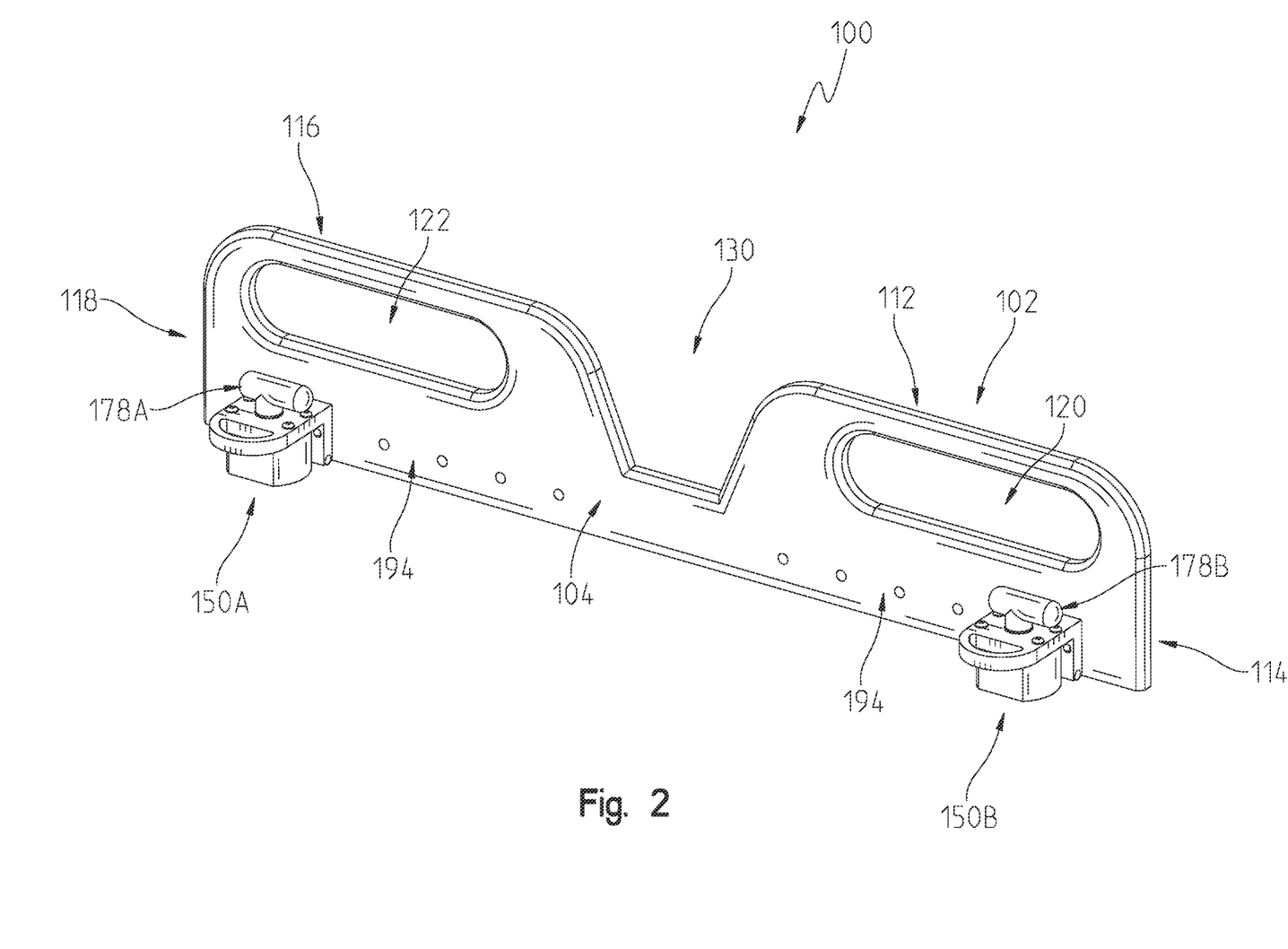
FIG. 2 illustrates a rear unexploded perspective view of the fence of FIG. 1.
Figure 9:
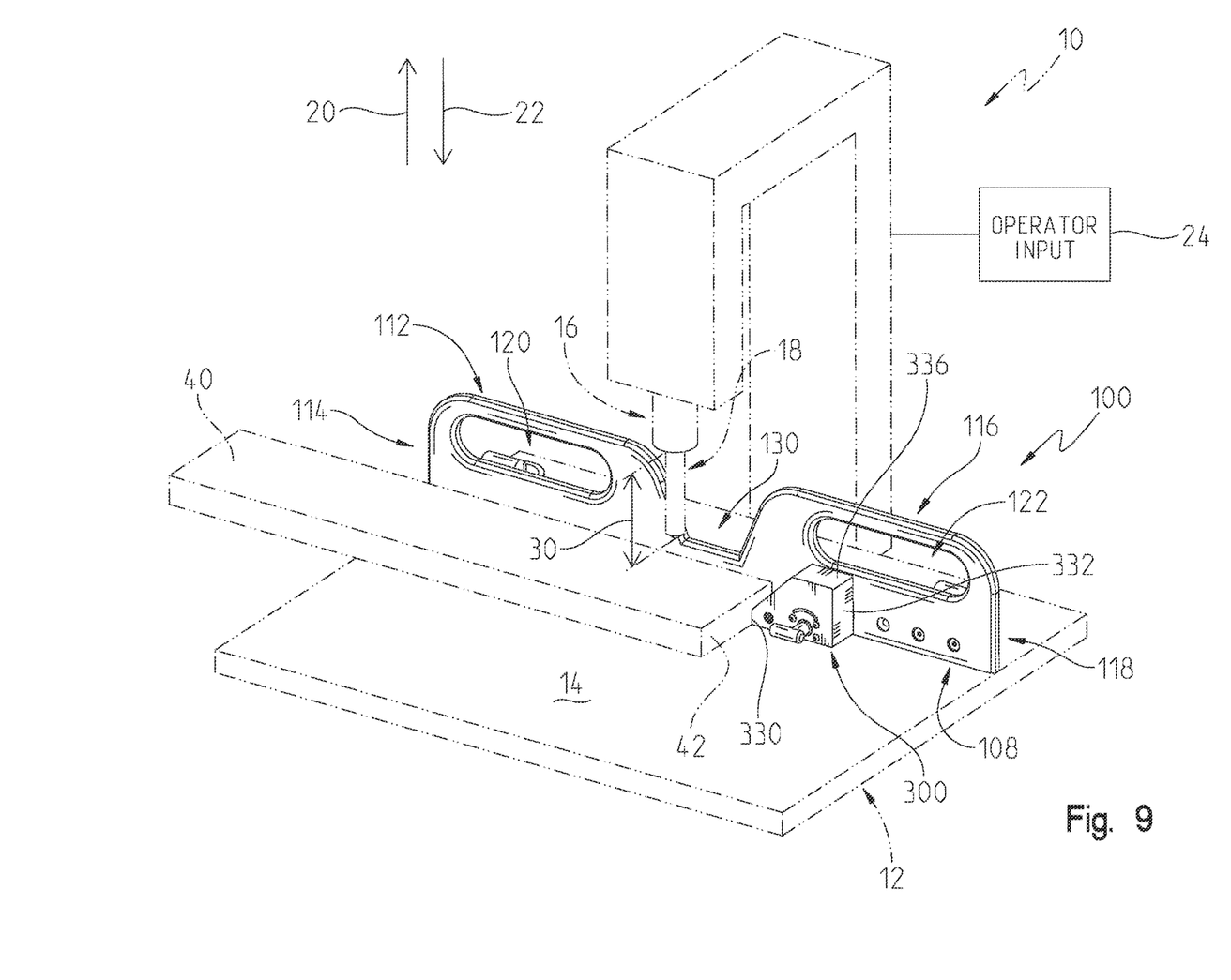
FIG. 9 illustrates the exemplary fence of FIG. 6 supported on a woodworking support of a drill press with the stop block positioned in a first arrangement relative to a base of the fence.
Figure 10:
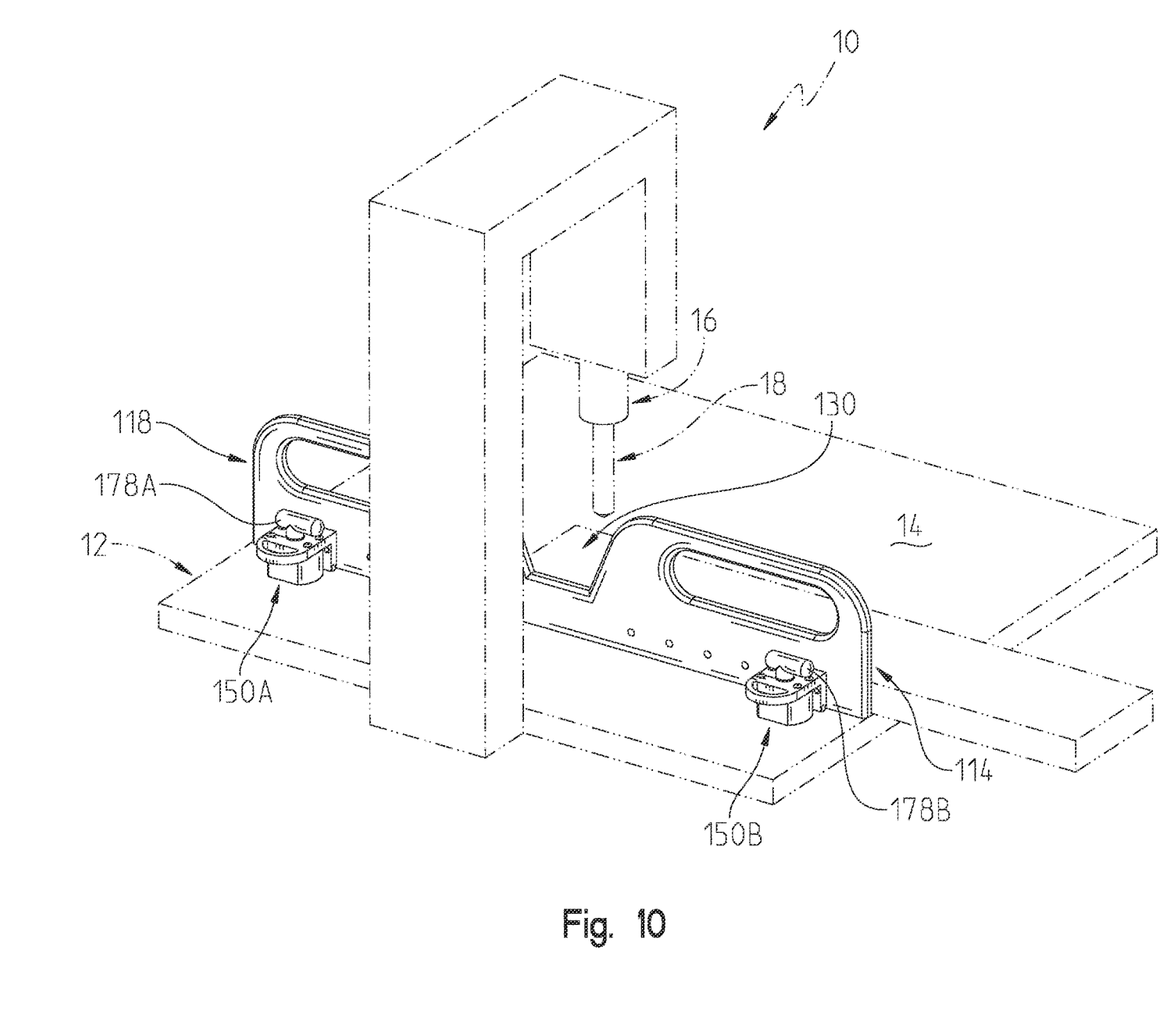
FIG. 10 illustrates a rear perspective view of the exemplary fence of FIG. 6 supported on a woodworking support of a drill press of FIG. 9.

Referring to FIG. 1, an accessory 100 for an exemplary woodworking device, a drill press 10, having a cutting tool, a drill bit 18, is shown. Referring to FIG. 9, drill press 10 includes a ferromagnetic woodworking support 12 having a support top 14 and a drill head 16. Conventional drill heads 16 include a chuck which couples a drill bit 18 to drill head 16. Further, conventional drill presses include an operator input 24, such as a rotary handle or other suitable input, which causes vertical movement of drill head 16 and hence drill bit 18 in direction 20 and direction 22. Accessory 100 may be used with other woodworking devices having woodworking supports, such as table saws, router tables, jointer tables, shaper tables, band saw tables and similar stock cutting machines.

Returning to FIG. 1, accessory 100 includes a base 102 having a first side 104, a second side 106 opposite first side 104, a bottom 108, and a top 110. In embodiments, base 102 is ferromagnetic. As illustrated, first side 104 and second side 106 are both planar and parallel to each other. In embodiments, first side 104 and second side 106 may be non-planar and/or non-parallel to each other. Base 102 includes a first handle 112 proximate a first end 114 of base 102 and a second handle 116 proximate a second end 118 of base 102, second end 118 being opposite of first end 114. First handle 112 has an opening 120 extending from first side 104 of base 102 to second side 106 of base 102. Similarly, second handle 116 has an opening 122 extending from first side 104 of base 102 to second side 106 of base 102. Openings 120 and 122 are sized to receive a hand of an operator to move base 102 relative to ferromagnetic woodworking support 12 of drill press 10 and drill head 16 of drill press 10. Base 102 may have fewer or additional handles.

Base 102 further includes a central recess 130 extending from first side 104 of base 102 to second side 106 of base 102. Central recess 130 is positioned between first handle 112 and first end 114. Central recess 130 is sized to receive drill head 16 of drill press 10. In embodiments, central recess 130 has a depth such that a height 132 of base 102 in the region below central recess 130 is less than a length 30 of drill bit 18 (see FIG. 9); thus allowing a full plunge of drill bit 18 through a workpiece, such as board 40 in FIG. 9, without drill head 16 of drill press 10 contacting base 102.

Figure 3:
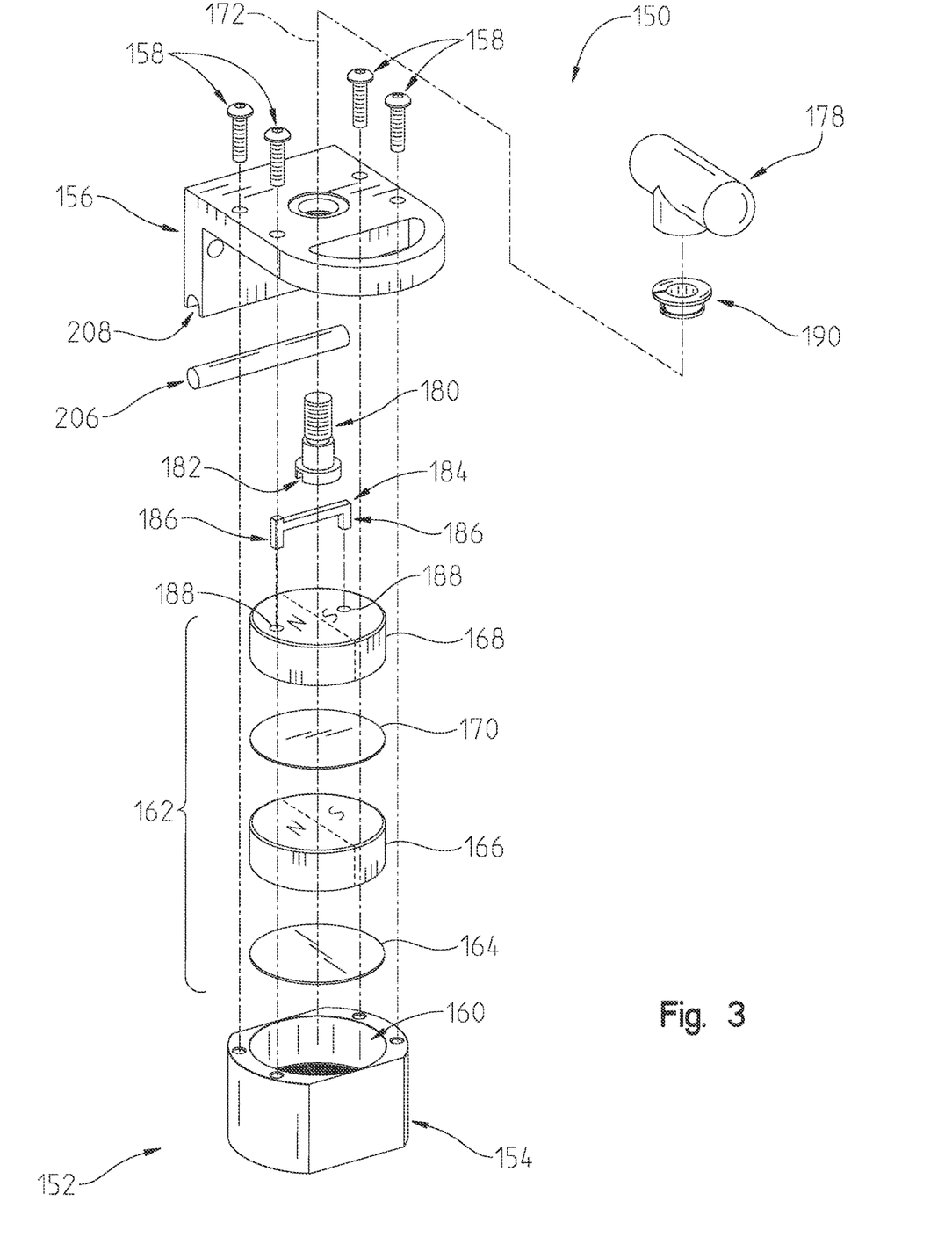
FIG. 3 illustrates an exploded view of one of the exemplary magnetic couplers of the fence of FIG. 1.

Accessory 100 further includes a plurality of magnetic couplers 150, illustratively two 150A and 150B, positioned on first side 104 of base 102. Referring to FIG. 3, each of magnetic couplers 150 includes a housing 152 including a lower housing portion 154 and an upper housing portion 156. Upper housing portion 156 is coupled to lower housing portion 154 with a plurality of fasteners 158. Lower housing portion 154 includes a central bore 160 which receives a switchable magnetic flux source 162. As explained herein, a switchable magnetic flux source is switchable between a first state wherein the magnetic coupler 150 does not produce an external magnetic field sufficient to couple the magnetic coupler 150 to the woodworking support 12 (OFF state) and a second state wherein the magnetic coupler 150 produces an external magnetic field sufficient to couple the magnetic coupler 150 to the woodworking support 12 (ON state). Central bore 160 receives a non-ferromagnetic support 164 which is supported by a lip at the bottom of central bore 160, a plurality of permanent magnets of switchable magnetic flux source 162 including a first permanent magnet 166 and a second permanent magnet 168 separated by a second non-ferromagnetic support 170. In embodiments, first permanent magnet 166 is held fixed relative to lower housing portion 154, such as with an adhesive or press-fit, and second permanent magnet 168 is movable relative to the first permanent magnet 166 about a vertical axis 172.

Figure 4:
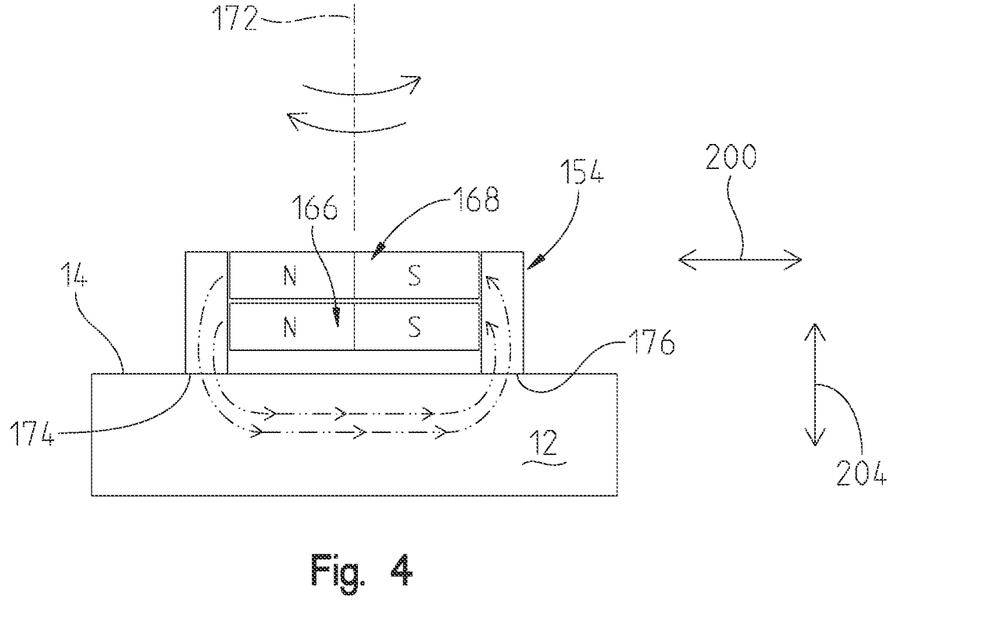
FIG. 4 illustrates a representative view of the magnetic coupler of FIG. 3 supported on an exemplary woodworking support and configured in an ON state.
Figure 5:
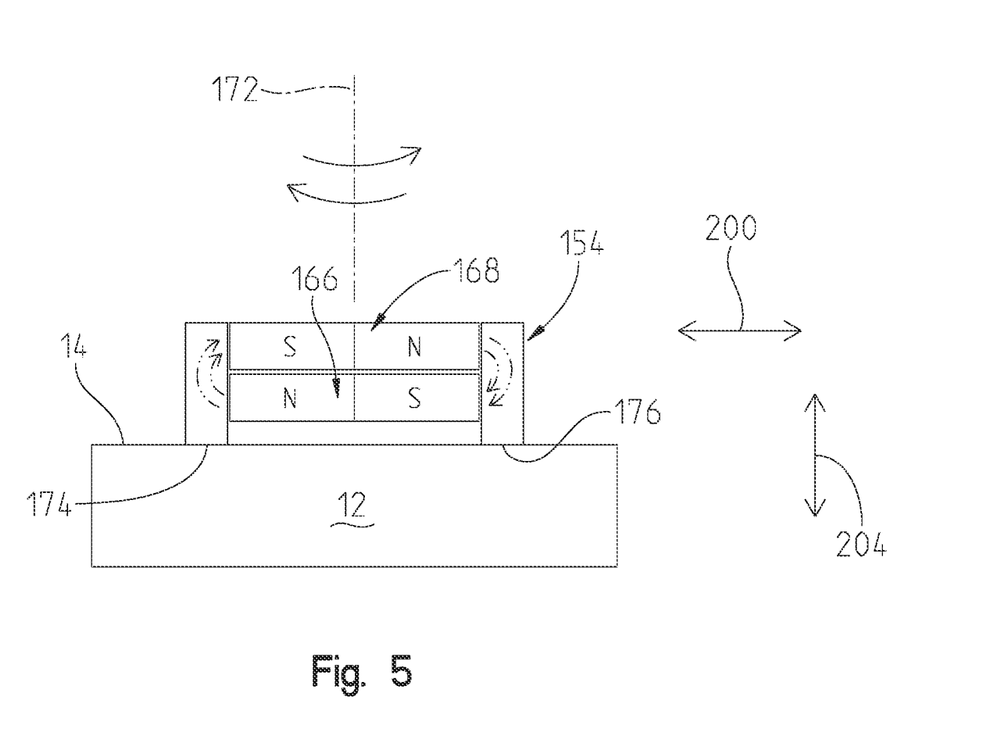
FIG. 5 illustrates a representative view of the magnetic coupler of FIG. 3 supported on an exemplary woodworking support and configured in an OFF state.
Figure 7:
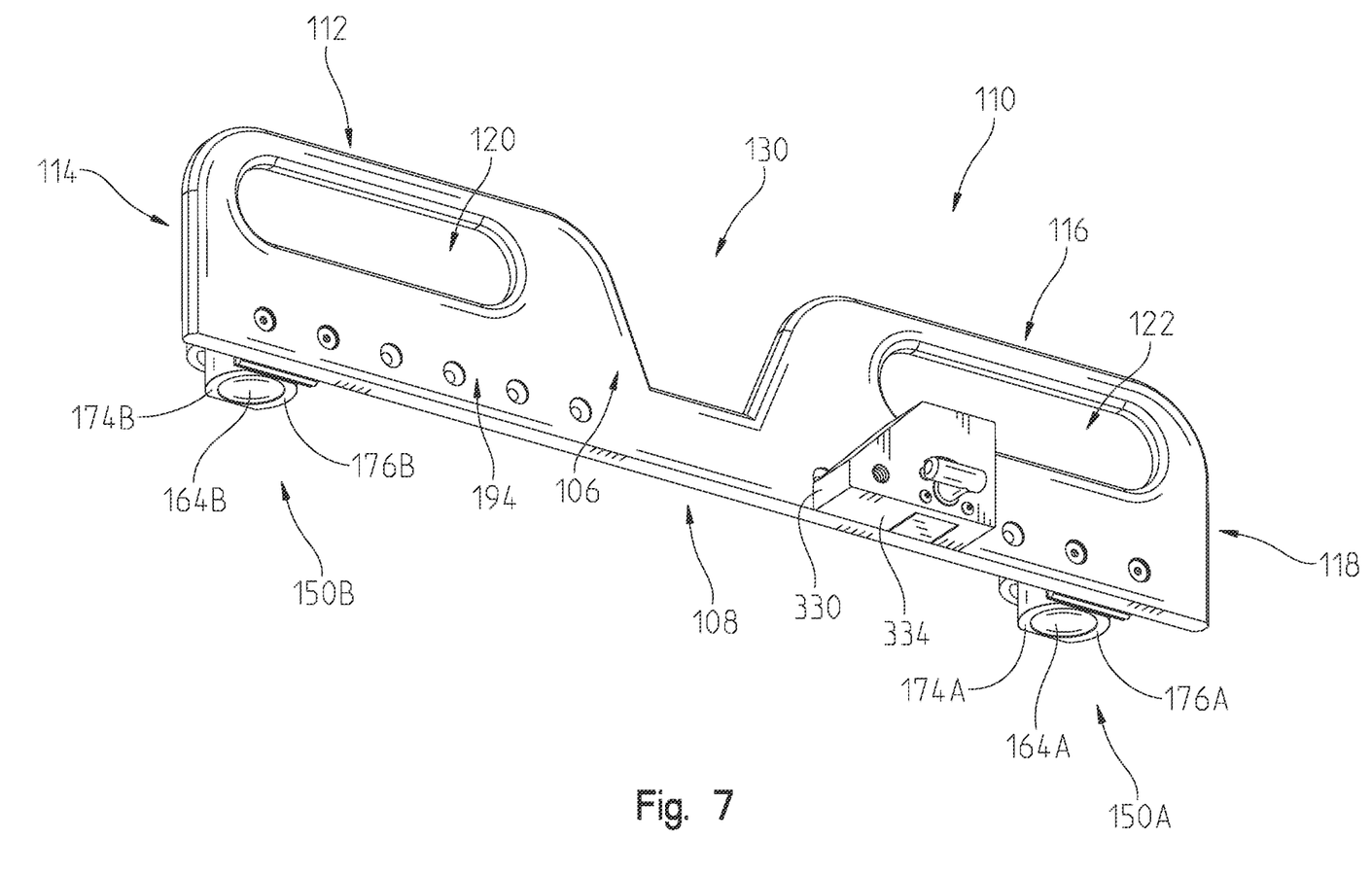
FIG. 7 illustrates a front lower perspective view of the embodiment of FIG. 6.
Figure 8:
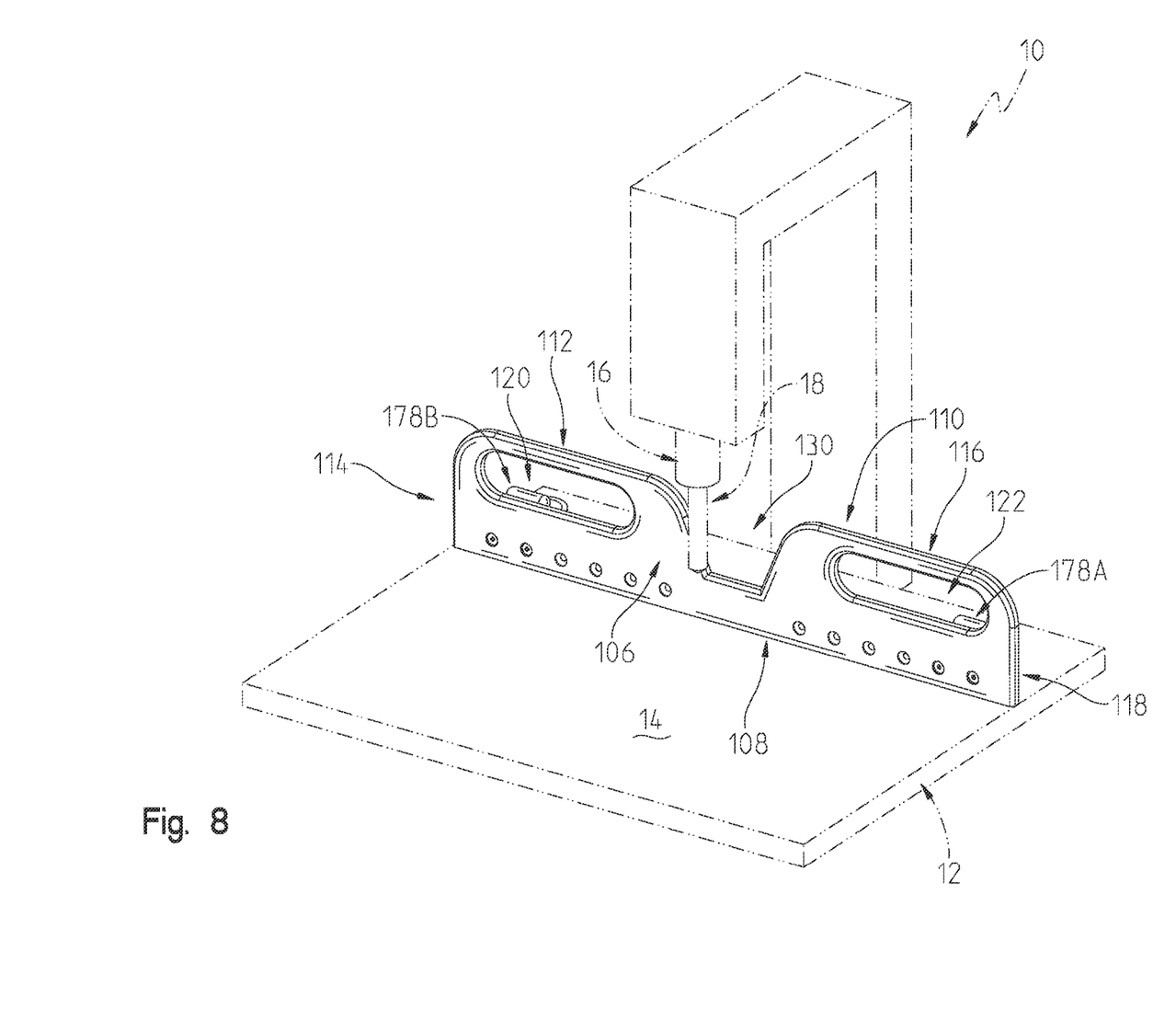
FIG. 8 illustrates the exemplary fence of FIG. 1 supported on a woodworking support of a drill press.

Magnetic couplers 150 further includes a plurality of woodworking support engagement surfaces, illustratively a north pole engagement surface 174 and a south pole engagement surface 176 (see FIGS. 4, 5, and 7). Referring to FIG. 4, second permanent magnet 168 is positioned relative to first permanent magnet 166 such that the north pole portion of second permanent magnet 168 is aligned with the north pole portion of first permanent magnet 166 and the south pole portion of second permanent magnet 168 is aligned with the south pole portion of first permanent magnet 166. In this arrangement, magnetic coupler 150 completes a magnetic circuit with ferromagnetic woodworking support 12 to hold magnetic coupler 150 relative to support top 14 of ferromagnetic woodworking support 12. This arrangement is referred to herein as an ON state. Referring to FIG. 5, second permanent magnet 168 is positioned relative to first permanent magnet 166 such that the north pole portion of second permanent magnet 168 is aligned with the south pole portion of first permanent magnet 166 and the south pole portion of second permanent magnet 168 is aligned with the north pole portion of first permanent magnet 166. In this arrangement, magnetic coupler 150 completes a magnetic circuit within lower housing portion 154 and magnetic coupler 150 may be moved relative to support top 14 of ferromagnetic woodworking support 12. This arrangement is referred to herein as an OFF state.

Returning to FIG. 3, magnetic couplers 150 further include an operator input 178 to orient second permanent magnet 168 relative to first permanent magnet 166 in one of the ON state of FIG. 4 wherein the respective magnetic coupler 150 is adapted to be magnetically coupled in a fixed location relative to ferromagnetic woodworking support 12 and an OFF state wherein the respective magnetic coupler 150 is adapted to be movable relative to ferromagnetic woodworking support 12. Operator input 178 is coupled to second permanent magnet 168 through a bolt 180 threadably coupled to operator input 178. Bolt 180 includes a slotted head 182 which receives a coupler 184. Coupler 184 includes a pair of legs 186 which are received in recesses 188 in second permanent magnet 168. A bushing 190 is provided to ease the rotation of the assembly of second permanent magnet 168, coupler 184, bolt 180 and operator input 178 relative to upper housing portion 156 of housing 152.

The switchable magnetic flux source 162 is one exemplary embodiment of a switchable magnetic flux source. Magnetic couplers 150 may include other suitable types of switchable magnetic flux sources. Some exemplary magnetic flux sources may have a single permanent magnet or multiple permanent magnets moveable as a group which are positionable in a first position within magnetic coupler 150 such that the magnet(s) shunts within the housing or is not in contact with pole portions of the housing (OFF state) and a second position wherein the magnet(s) are part of a magnetic circuit to hold the magnetic coupler to the woodworking support (ON state). Additional exemplary switchable magnetic flux sources may not move relative to the housing. For example, at least a portion of the permanent magnets are electro-permanent magnets which have their respective magnetic state altered by passing a current through a coil positioned about the respective magnets. In other examples, an electro-magnet may be used.

Referring to FIG. 1, base 102 includes a plurality of interfaces 194, illustratively apertures, to mechanically couple the plurality of magnetic couplers 150 to base 102 in a plurality of arrangements. Mechanical couplers, illustratively fasteners 192, are received in interfaces 194 and are threaded into corresponding apertures 196 in a back surface 198 of upper housing portion 156 of the respective magnetic coupler 150 to mechanically hold magnetic coupler 150 to base 102. Fasteners 192 may be removed to selectively couple magnetic couplers 150 to base 102 through different pairs of apertures in base 102 allowing accessory 100 to be used with different sizes of ferromagnetic woodworking support 12. In embodiments first side 104 of base 102 and back surface 198 of magnetic couplers 150 are both machined to make second side 106 of base 102 perpendicular to north pole engagement surface 174 and south pole engagement surface 176 of magnetic couplers 150 and thus perpendicular to support top 14 of ferromagnetic woodworking support 12 when accessory 100 is coupled to ferromagnetic woodworking support 12. In embodiments, each of magnetic couplers 150 includes a resilient member 206 (see FIG. 3) received in a recess 208 in the respective upper housing portion 156 of housing 152. Resilient member 206 is made of a rubber or other compressible material. Resilient member 206 increases the friction between support top 14 of ferromagnetic woodworking support 12 and magnetic couplers 150 when operator input 178 of magnetic couplers 150 is actuated by an operator to the ON state of FIG. 4.

As shown in FIG. 1, the plurality of interfaces 194 are spaced apart along a first direction 200 perpendicular to a horizontal coupling direction 202 of magnetic couplers 150 to base 102. Each of magnetic couplers 150 are adapted to be magnetically coupled to support top 14 of ferromagnetic woodworking support 12 in a vertical coupling direction 204 and mechanically coupled to base 102 in horizontal coupling direction 202.

Figure 6:
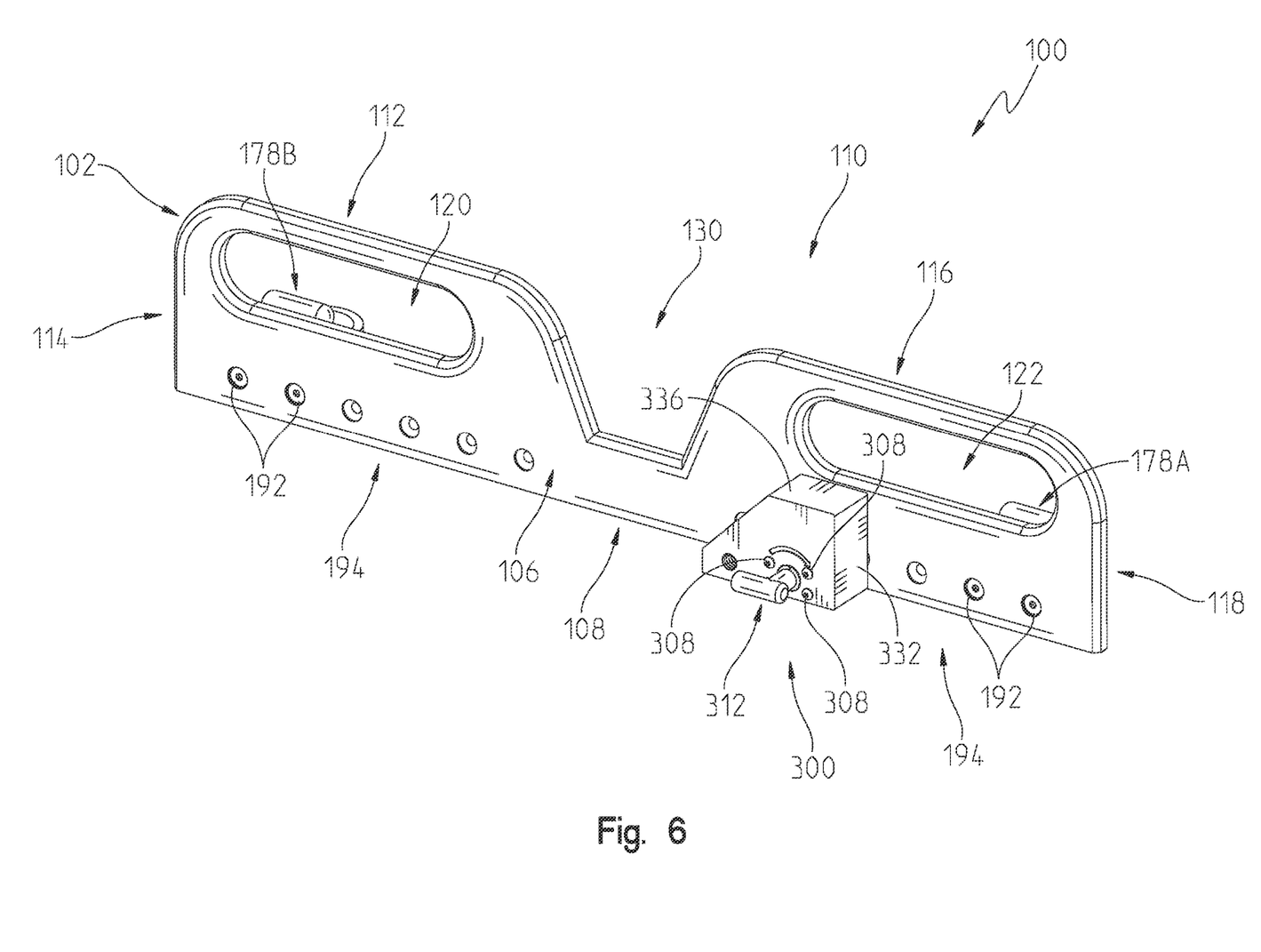
FIG. 6 illustrates a front unexploded perspective view of another embodiment of the fence of FIG. 1 including an exemplary magnetic stop block.
Figure 13:
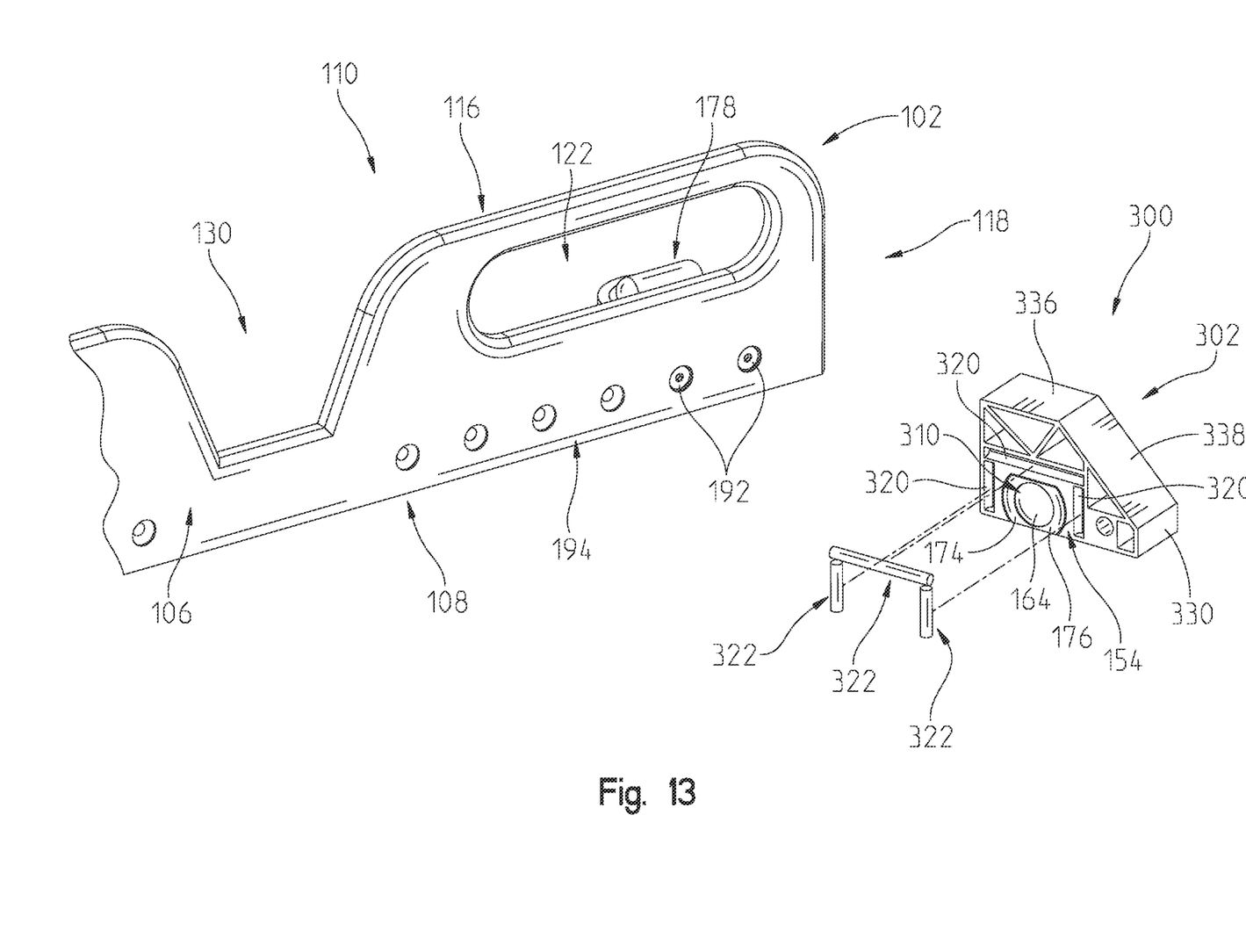
FIG. 13 illustrates a partial exploded view of the stop block of FIG. 6 exploded relative to the base of the fence.

Referring to FIGS. 6 and 13, accessory 100 further includes a stop block 300 which is magnetically couplable to base 102. Stop block 300 includes a stop block base 302 and a stop block switchable magnetic flux source 310 supported by stop block base 302. Stop block switchable magnetic flux source 310 includes a lower housing portion 154, non-ferromagnetic support 164, first permanent magnet 166, second non-ferromagnetic support 170, and second permanent magnet 168 arranged the same as in magnetic couplers 150 (see FIG. 3). Further, lower housing portion 154 of stop block switchable magnetic flux source 310 includes north pole engagement surface 174, referred to as a stop block engagement surface, and south pole engagement surface 176, referred to as a stop block engagement surface. The operation of stop block switchable magnetic flux source 310 is the same as shown in FIGS. 4 and 5 for magnetic couplers 150. Lower housing portion 154 is secured to stop block base 302 with fasteners 308 (see FIG. 6).

An operator input 312 extends from stop block base 302 and is actuatable by an operator to position stop block switchable magnetic flux source 310 in either the ON state of FIG. 4 or the OFF state of FIG. 5. Operator input 312 is coupled to second permanent magnet 168 of stop block switchable magnetic flux source 310 in the same manner as operator input 178 to second permanent magnet 168 of magnetic couplers 150.

Referring to FIG. 13, stop block base 302 includes a plurality of recesses 320 to receive respective resilient members 322. Resilient members 322 are made of a rubber or other compressible material. Resilient members 322 increase the friction between second side 106 of base 102 and stop block 300 when operator input 312 of stop block 300 is actuated by an operator to the ON state of FIG. 4. When north pole engagement surface 174 and south pole engagement surface 176 of stop block 300 are positioned against second side 106 of base 102 and operator input 312 of stop block 300 is actuated to the ON state of FIG. 4, stop block 300 is held in a fixed position relative to base 102. When operator input 312 of stop block 300 is actuated to the OFF state of FIG. 5, stop block 300 is movable relative to base 102.

Stop block base 302 includes a plurality of stop surfaces. Exemplary stop surfaces include a first end stop surface 330 (see FIG. 7), a second end stop surface 332 (see FIG. 6), a bottom stop surface 334 (see FIG. 7), a top stop surface 336 (see FIG. 6), and an angled stop surface 338 (see FIG. 13). Based on the positioning of stop block 300 relative to base 102, any of the plurality of stop surfaces may be used to hold and/or position a workpiece.

Stop block 300 may be coupled to base 102 in a plurality of arrangements. A first arrangement is shown in FIG. 9 wherein stop block 300 is positioned on second side 106 of base 102 and bottom stop surface 334 of stop block 300 is coplanar with bottom 108 of base 102 and contacting support top 14 of ferromagnetic woodworking support 12. In this arrangement, first end stop surface 330 of stop block 300 is a stop for an end 42 of board 40. By having angled stop surface 338 angled, stop block 300 may be placed close to central recess 130 to drill holes close to end 42 of board 40 and provide the needed clearance for drill head 16 of drill press 10.

Figure 11:
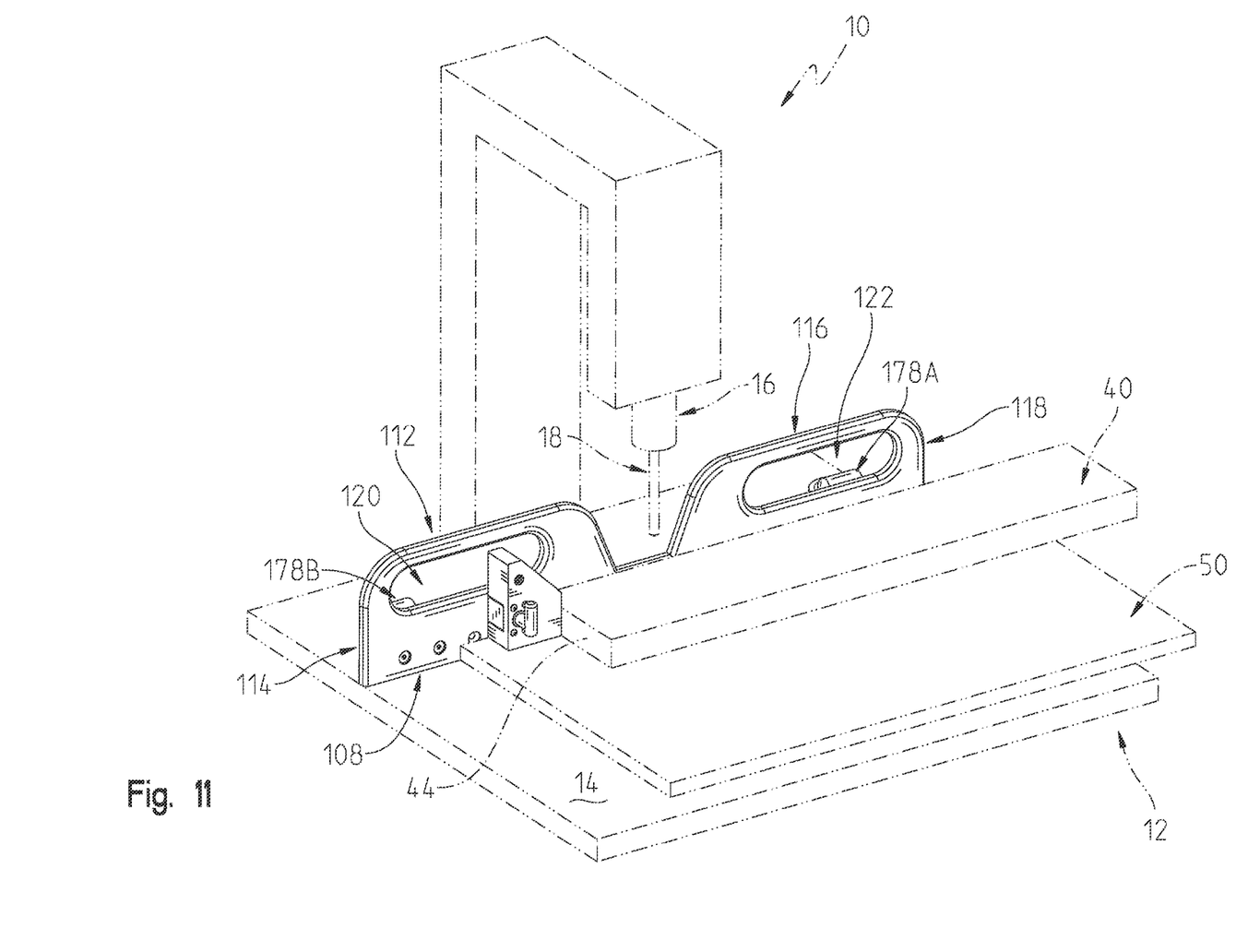
FIG. 11 illustrates the exemplary fence of FIG. 6 supported on a woodworking support of a drill press with the stop block positioned in a second arrangement relative to a base of the fence.

A second arrangement of stop block 300 relative to base 102 is shown in FIG. 11 wherein stop block 300 is positioned on second side 106 of base 102 and second end stop surface 332 of stop block 300 is parallel with bottom 108 of base 102 and offset upward relative to bottom 108 of base 102. In this arrangement, a board 50 may be positioned between support top 14 of ferromagnetic woodworking support 12 and stop block 300. Stop block 300 may be placed in contact with board 50 to hold board 50 relative to ferromagnetic woodworking support 12. In the arrangement shown in FIG. 11, top stop surface 336 also is used as a stop for a second end 44 of board 40.

Figure 12:
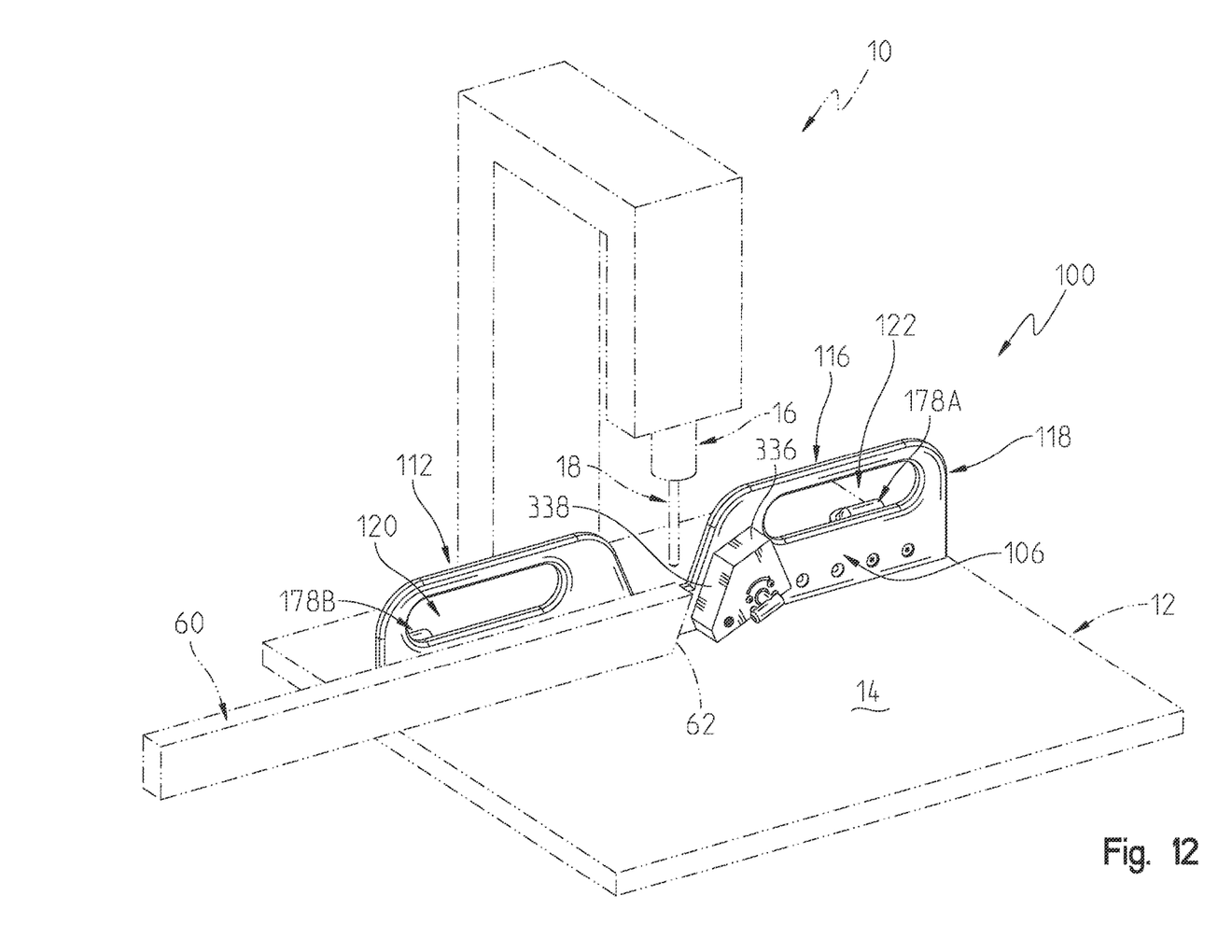
FIG. 12 illustrates the exemplary fence of FIG. 6 supported on a woodworking support of a drill press with the stop block positioned in a third arrangement relative to a base of the fence.

A third arrangement of stop block 300 relative to base 102 is shown in FIG. 12 wherein stop block 300 is positioned on second side 106 of base 102 and bottom stop surface 334 of stop block 300 is angled relative to bottom 108 of base 102. In this arrangement angled stop surface 338 is parallel to a non-vertical end 62 of a board 60.

A fourth arrangement of stop block 300 relative to base 102 has stop block 300 positioned on first side 104 of base 102 with magnetic couplers 150 to place stop block 300 out of the way from operations not needing a stop block. As noted above, in many arrangements magnetic couplers 150 are completely positioned on first side 104 of base 102 and stop block 300 is positioned completely on second side 106 of base 102.

Figure 14:
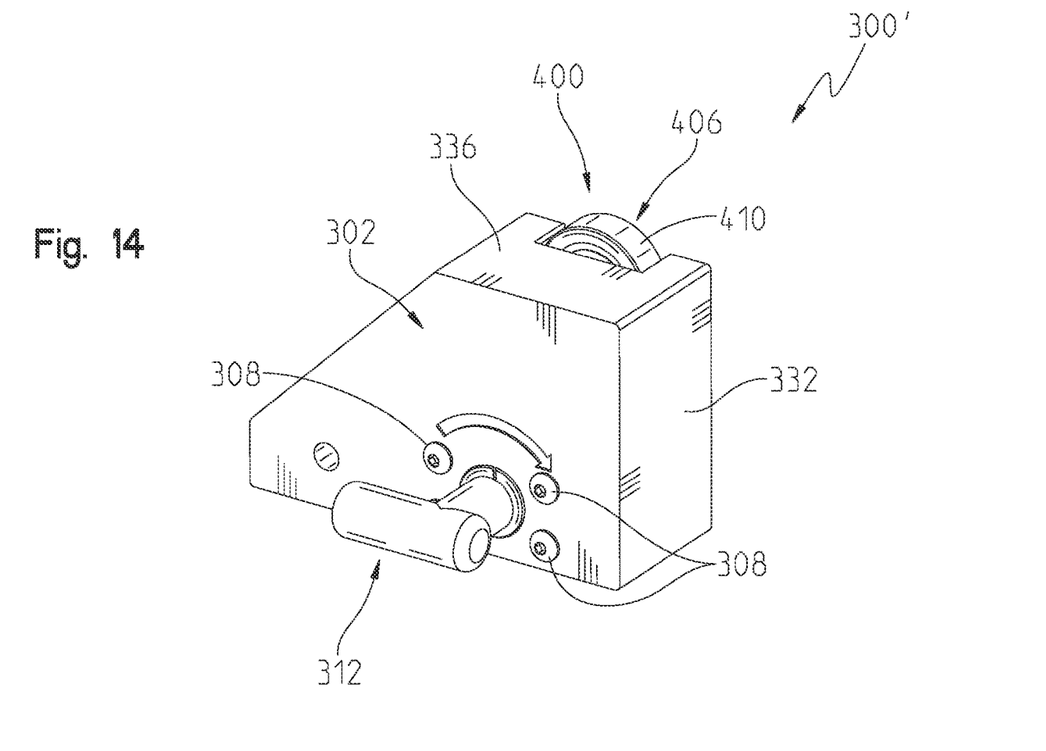
FIG. 14 illustrates a front perspective view of another exemplary stop block.
Figure 15:
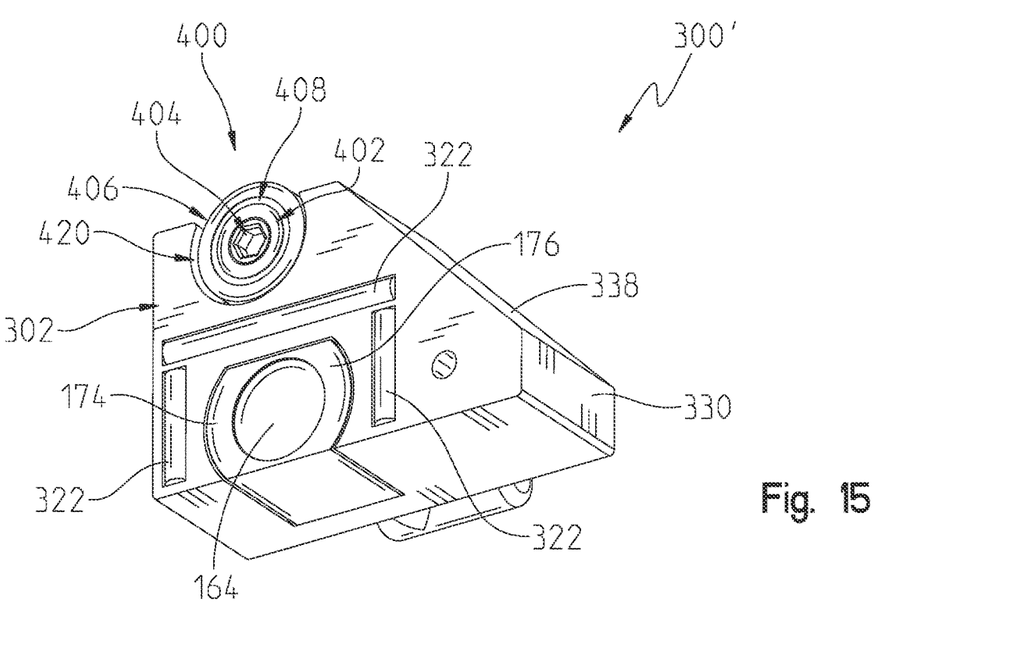
FIG. 15 illustrates a rear perspective view of the stop block of FIG. 14.

Referring to FIGS. 14 and 15, another exemplary stop block 300' is shown. Stop block 300' is identical to stop block 300 except that a recess 420 is provided in stop block base 302 to accommodate a bearing 400. Bearing 400 includes an inner portion 402 which is secured to stop block base 302 through a fastener, illustratively bolt 404. An outer portion 406 of bearing 400 is rotatably coupled to inner portion 402 through a ring 408 of rolling elements.

An outer circumferential surface 410 of outer portion 406 extends beyond an exterior envelope of stop block base 302 such that outer circumferential surface 410 may contact and interact with board 40 or other workpiece. As shown in FIG. 14, outer circumferential surface 410 extends beyond surface 336 of stop block base 302, but in alternative embodiments outer circumferential surface 410 may extend beyond another exterior surface of stop block base 302 or a combination of exterior surfaces of stop block base 302.

The inclusion of bearing 400 in stop block 300' results in board 40 or other workpiece to more smoothly move relative to stop block 300', such as when board 40 is positioned between stop block 300' and another portion of a woodworking device, such as a table saw, drill press, or other suitable devices. In one example, the stop block 300' may be taken over to a table saw, and the bearing may be used as a thin stock rip guide. In another example, bearing 400 of stop block 300' may be used to keep a workpiece, such as board 40, against base 102 when drilling multiple holes in the workpiece with a drill press 10 such that all the holes are the same distance from base 102. In this example, stop block 300' is separated from base 102.

While this invention has been described as having exemplary designs, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. An accessory for a woodworking device having a ferromagnetic woodworking support and a cutting tool, the accessory comprising:
a base having a first side, a second side opposite the first side, a bottom, and a top, the base being ferromagnetic;
a plurality of magnetic couplers positioned on the first side of the base, each of the plurality of magnetic couplers comprising:
a housing;
a switchable magnetic flux source supported by the housing switchable between an ON state wherein the respective magnetic coupler is adapted to be magnetically coupled in a fixed location relative to the ferromagnetic woodworking support and an OFF state wherein the respective magnetic coupler is adapted to be movable relative to the ferromagnetic woodworking support; and
a plurality of woodworking support engagement surfaces supported by the housing and magnetically coupled to the switchable magnetic flux source, the plurality of woodworking support engagement surfaces adapted to contact the ferromagnetic woodworking support, a first woodworking support engagement surface of the plurality of woodworking support engagement surfaces corresponding to a north pole of the respective magnetic coupler and a second woodworking support engagement surface of the plurality of woodworking support engagement surfaces corresponding to a south pole of the respective magnetic coupler; and
a plurality of mechanical couplers which couple the plurality of magnetic couplers to the base; and
a stop block magnetically couplable to the base, the stop block comprising:
a stop block base having at least one stop surface; and
a stop block switchable magnetic flux source supported by the stop block base, the stop block switchable magnetic flux source being switchable between an ON state wherein the stop block switchable magnetic flux source is adapted to be magnetically coupled in a fixed location relative to the second side of the base and an OFF state wherein the stop block switchable magnetic flux source is adapted to be movable relative to the second side of the base; and
a plurality of stop block engagement surfaces supported by the stop block base and magnetically coupled to the stop block switchable magnetic flux source, the plurality of stop block engagement surfaces positioned to contact the base, a first stop block engagement surface of the plurality of stop block engagement surfaces corresponding to a north pole of the stop block and a second stop block engagement surface of the plurality of stop block engagement surfaces corresponding to a south pole of the stop block.

2. The accessory of claim 1, wherein each of the plurality of magnetic couplers are positioned completely on the first side of the base.

3. The accessory of claim 1, wherein the stop block is coupled the base in a plurality of arrangements.

4. The accessory of claim 3, wherein the plurality of arrangements includes a first arrangement wherein the stop block is positioned on the second side of the base and a first side of the stop block is coplanar with the bottom of the base.

5. The accessory of claim 3, wherein the plurality of arrangements includes a second arrangement wherein the stop block is positioned on the second side of the base and a first side of the stop block is parallel with the bottom of the base and offset upward relative to the bottom of the base.

6. The accessory of claim 3, wherein the plurality of arrangements includes a third arrangement wherein the stop block is positioned on the second side of the base and a first side of the stop block is angled relative to the bottom of the base.

7. The accessory of claim 3, wherein the plurality of arrangements includes a fourth arrangement wherein the stop block is positioned on the first side of the base.

8. The accessory of claim 1, wherein each of the magnetic couplers are adapted to be magnetically coupled to the woodworking support in a vertical coupling direction and mechanically coupled to the base in a horizontal coupling direction.

9. The accessory of claim 8, wherein the base includes a plurality of interfaces to mechanically couple the plurality of magnetic couplers to the base in a plurality of arrangements.

10. The accessory of claim 9, wherein the plurality of interfaces are spaced apart along a first direction perpendicular to the horizontal coupling direction.

11. The accessory of claim 10, wherein the base includes a first handle having an opening extending from the first side of the base to the second side of the base.

12. The accessory of claim 11, wherein the base includes a central recess sized to receive the cutting tool of the woodworking device, the central recess extending from the first side of the base to the second side of the base.

13. The accessory of claim 12, wherein the base includes a second handle having an opening extending from the first side of the base to the second side of the base, the central recess being positioned between the first handle and the second handle.

14. The accessory of claim 1, wherein the base includes a first handle having an opening extending from the first side of the base to the second side of the base.

15. The accessory of claim 14, wherein the base includes a central recess sized to receive the cutting tool of the woodworking device, the central recess extending from the first side of the base to the second side of the base.

16. The accessory of claim 15, wherein the base includes a second handle having an opening extending from the first side of the base to the second side of the base, the central recess being positioned between the first handle and the second handle.

17. The accessory of claim 1, wherein for each of the plurality of magnetic couplers, the switchable magnetic flux source includes a plurality of permanent magnets.

18. The accessory of claim 1, wherein for each of the plurality of magnetic couplers, the switchable magnetic flux source includes a plurality of permanent magnets, the plurality of permanent magnets including a first permanent magnet and a second permanent magnet movable relative to the first permanent magnet.

19. The accessory of claim 18, wherein each of the plurality of magnetic couplers further includes an operator input to orient the second permanent magnet relative to the first permanent magnet in one of the ON state wherein the respective magnetic coupler is adapted to be magnetically coupled in the fixed location relative to the ferromagnetic woodworking support and the OFF state wherein the respective magnetic coupler is adapted to be movable relative to the ferromagnetic woodworking support.

20. The accessory of claim 1, wherein the stop block switchable magnetic flux source includes a plurality of permanent magnets.

21. The accessory of claim 1, wherein the stop block switchable magnetic flux source includes a plurality of permanent magnets, the plurality of permanent magnets including a first permanent magnet and a second permanent magnet movable relative to the first permanent magnet.

22. The accessory of claim 21, wherein the stop block further includes an operator input to orient the second permanent magnet of the stop block switchable magnetic flux source relative to the first permanent magnet of the stop block switchable magnetic flux source in one of the ON state wherein the stop block switchable magnetic flux source is adapted to be magnetically coupled in the fixed location relative to the second side of the base and the OFF state wherein the stop block switchable magnetic flux source is adapted to be movable relative to the second side of the base.

23. A stop block for use with a woodworking device, the stop block comprising:
a stop block base having at least one stop surface;
a stop block switchable magnetic flux source supported by the stop block base, the stop block switchable magnetic flux source being switchable between an ON state wherein the stop block switchable magnetic flux source is adapted to be magnetically coupled in a fixed location relative to the woodworking device and an OFF state wherein the stop block switchable magnetic flux source is adapted to be movable relative to the woodworking device;
a plurality of stop block engagement surfaces supported by the stop block base and magnetically coupled to the stop block switchable magnetic flux source, the plurality of stop block engagement surfaces positioned to contact the woodworking device, a first stop block engagement surface of the plurality of stop block engagement surfaces corresponding to a north pole of the stop block and a second stop block engagement surface of the plurality of stop block engagement surfaces corresponding to a south pole of the stop block;
a bearing supported by the stop block base, the bearing including an inner portion and an outer portion rotatable relative to the inner portion, a circumferential surface of the outer portion extending beyond an exterior envelope of the stop block base.

* * * * *